United States Patent [19]

Ganczarczyk

[11] Patent Number: 4,705,638
[45] Date of Patent: Nov. 10, 1987

[54] WASTE WATER TREATMENT

[75] Inventor: Jerzy J. Ganczarczyk, Islington, Canada

[73] Assignee: The University of Toronto Innovations Foundation, Canada

[21] Appl. No.: 833,586

[22] Filed: Feb. 27, 1986

Related U.S. Application Data

[63] Continuation of Ser. No. 606,655, May 3, 1984, abandoned.

[51] Int. Cl.[4] ............................................. C02F 1/52
[52] U.S. Cl. .................................. 210/710; 106/117; 210/721; 210/738; 210/909; 210/912; 210/913; 210/914
[58] Field of Search .............. 75/5; 106/117; 210/702, 210/710, 717, 724, 726, 738, 751, 769, 770, 909, 912–914, 721, 754

[56] References Cited

U.S. PATENT DOCUMENTS

| | | | |
|---|---|---|---|
| 2,746,920 | 5/1958 | Wundeley | 210/751 |
| 3,326,669 | 6/1967 | Stirling | 75/5 |
| 3,920,795 | 11/1975 | Selmeczi et al. | 106/109 |
| 4,124,405 | 11/1978 | Quienot | 210/751 |
| 4,213,779 | 7/1980 | Caswell | 75/5 |
| 4,219,418 | 8/1980 | Pilon | 210/909 |
| 4,229,295 | 10/1980 | Krofchak | 210/751 |
| 4,377,483 | 3/1983 | Yamashita et al. | 210/912 |
| 4,404,105 | 9/1983 | de Lockerente et al. | 106/117 |

Primary Examiner—Peter Hruskoci
Attorney, Agent, or Firm—Lyon & Lyon

[57] ABSTRACT

A method of treating wastewater containing a contaminant selected from the group consisting of heavy metal cations, tars, oils and phenols or mixtures thereof, comprising mixing said wastewater with an effective amount of desulfurization slag, the composition of said slag including calcium oxide, calcium sulfide and iron oxides, causing deposition of said contaminant from the mixture, and separating the deposit from the supernatant liquid.

12 Claims, No Drawings

WASTE WATER TREATMENT

This application is a continuation of application Ser. No. 606,655 filed May 3, 1984, now abandoned.

This invention relates to wastewater treatment and, more particularly, to treatment of wastewater bearing heavy metal ions.

The environmental impact of discharging effluent containing heavy metal ions into the environment has been studied and appraised in recent years with the result that the quality of effluent has been legislated, requiring certain minimum criteria to be met, prior to discharge of effluent. These criteria are of particular concern to manufacturing industries, especially ore refining industries such as steel foundries and the like where large amounts of heavy metals are generated as waste during processing of ores. The ability of such industries to comply with water quality regulations is also governed, however, by the need to minimize cost of the water treatment process.

In some steel plants, treatment of blast furnace effluent water bearing heavy metal ions involves introduction of sodium hydroxide into the wastewater to precipitate cations of heavy metals in hydroxide form followed by flocculation and removal of the solids prior to discharge of the remaining effluent. Elsewhere it is understood that sulfide is used for removal of heavy metal cations. In either case, however, the reagents required must be purchased, thereby increasing the cost of such treatment.

The present invention utilizes a source of hydroxides and sulfides commonly available on the site of some steel foundries, as a waste product. This source is desulfurization slag, a waste product resulting from a desulfurization process effected on molten iron or "pig iron" in the steel industry. Its use in effecting treatment of wastewater is therefore especially economically attractive.

Desulfurization slag is produced in a process wherein the molten iron is heated externally of the blast furnace, with a suitable compound such as calcium carbide, to extract sulfur from the iron by conversion of sulfur present in hot iron into calcium sulfide which separates from the hot iron and is subsequently removed from the heating vessel together with other compounds, as desulfurization slag.

The resultant slag contains the products of the desulfurization process which include oxides of calcium and sulfides of calcium as well as a substantial amount of oxides of iron, other metal oxides in trace amounts and a small amount of elemental iron.

It has now been found that an aqueous suspension of desulfurization slag provides both sulfides and hydroxides especially useful in combination in precipitating heavy metal cations from waste water. In addition, the oxides of iron contained within the slag are useful as adsorbing/absorbing agents which allow deposition of certain organic compounds contained in some wastewaters therefrom.

Thus, in accordance with the present invention, there is provided a method of treating wastewater containing a contaminant selected from the group consisting of heavy metal cations, tars, oils and phenols or mixtures thereof, comprising mixing said wastewater with an effective amount of desulfurization slag, the composition of said slag including calcium oxide, calcium sulfide and iron oxides causing deposition of said contaminant from the mixture, and separating the deposit from the supernatant liquid.

The physical composition of the desulfurization slag may vary depending on, inter alia, the composition of the pig iron from which the slag is generated. Generally desulfurization slag is comprised of the following elements in combined form, in the approximate weight ranges:

| COMPONENT | % BY WEIGHT OF TOTAL COMPOSITION |
|---|---|
| Iron | 45–48 |
| Calcium | 10–15 |
| Sulfur | 1.5–1.6 |

Both the calcium and iron are typically present as oxides. The calcium is, as mentioned, normally associated also with sulfur as calcium sulfides. Trace amounts of other compounds may also be present.

When the desulfurization slag is mixed with water, the calcium oxide and sulfide in the slag are converted to heavy-metal-cation-precipitating hydroxide and sulfide ions. The greater affinity of the heavy metal cations for the hydroxides and sulfides with respect to the same such calcium compounds permits formation of and precipitation of heavy metal cation compounds and/or complexes.

The high temperature extraction of sulfur from hot iron also results in the formation of oxides of iron which are retrieved in the desulfurization slag. In addition to the iron oxides, some elemental iron and complexes thereof escape the extraction process. These iron oxide compounds are contained within the desulfurization slag and provide additional advantages when desulfurization slag is used to treat wastewater bearing organic compounds such as oils, tars and some polycyclic compounds such as phenols. Of particular importance in this regard is phenol removal. Commonly, blast furnace wastewater contains phenol and its derivatives, originating from the coke used in the blast furnace. It is environmentally important to extract phenols before the wastewaters are subjected to a subseqent chlorination step in their purification treatment, since chlorinated phenols are carcinogenic, and cannot be simply discarded. In the present invention, the iron compounds are available from the desulfurization slag for formation of and ultimate deposition of iron complexes which may include iron phenol complexes. The iron complexes are also available for deposition of oils and tars which may be present in some wastewater particularly in wastewater generated during production of coke.

Crude desulfurization slag is not uniform in particle size. Portions of the slag have a consistency which generally approaches that of soil while there are present also larger portions or chunks. In order to improve the efficacy of the slag in depositing heavy metal ions and iron complexes, it is preferable to process the slag mechanically so that a generally uniform particle size is achieved. This mechanical processing, e.g. milling, allows maximum surface area of slag for contact with the wastewater as well as easier manipulation of the slag during introduction thereto of wastewater. Among the heavy metal cations which may be removed according to the process of the present invention, are cations of zinc, cadium, copper, nickel lead, mercury, manganese and chromium.

The composition of the desulfurization slag and the relative heavy-metal ion organic compound concentration of the wastewater to be treated will dictate the amount of slag which is required to effect deposition of the water-borne heavy metal cations and/or organic compounds. It is preferable to utilize an excess of slag during treatment to ensure maximum extraction of the ions and organic compounds from the water. The precise amounts of reagents required can be determined from analysis of both wastewater and slag followed by extrapolation to the respective stoichiometric equations which represent the precipitating reactions, e.g. in the case of zinc removal.

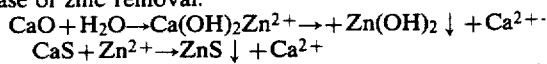

The combination of both calcium hydroxide and calcium sulfide in the precipitant, derived from the slag, is particularly advantageous and appears to provide a synergistic effect in the process of the invention. Ambient reaction temperatures are suitable.

One mole of CaO combines with one mole of water to precipitate one mole of zinc ions, and similarly one mole of CaS precipitates one mole of zinc ions. Milling of slag, to provide increased surface area thereof will speed up subsequent reactions and permit a more accurate quantitative analysis of suitable amount of reactants.

It will be appreciated that the density of the slag exceeds that of the wastewater to be treated, a factor which may influence efficient process operation. It is preferable to create a suspension of slag within the waste water. This may be accomplished by providing mechanical means for agitating the slag in the presence of the wastewater or alternatively, or in combination with mechanical agitation, the rate of flow of the wastewater encountering the slag may be adjusted to suspend the slag within the wastewater. It will be appreciated that use of this method entails use of the milled slag rather than slag in its crude form.

In the preferred process according to the present invention, milled slag is introduced into a container containing wastewater. Agitation of the wastewater contacting the milled slag is adjusted to suspend the milled slag within the wastewater whereafter the intensive agitation is abated and the mixing allowed to continue with reduced agitation to allow more thorough reaction. The process may be conducted in either batch mode or continuous mode.

In the batch mode of operating the process, the wastewater and slag are added to a container and treated as discussed above. In order to allow for separation of the deposit from the wastewater, agitation is halted. The treated wastewater may then be decanted. For each batch reaction replacement of the milled slag will be required in order to obtain desired results.

In the continuous mode of operating the process, the milled slag may be added to the process water, under agitation, as it flows through a vessel past an addition station. The suspension may then move continuously to a reaction vessel having only mild agitation. Subsequently it flows into a settling tank where sludge may settle from the liquid and may then be decanted off for further processing or disposal.

In a particularly preferred embodiment of the present invention, desulfurized slag is used to treat wastewater created during the iron extraction process in the blast furnace. Gases are emitted during smelting which are directed out of the blast furnace and are subsequently "scrubbed" by contact with water. Cations of heavy metals such as Zn, Cu, Cd, Pb and Ni and other compounds such as phenols are brought with the gases to the scrubbing water in which they are extracted. An added advantage inherent in the use of desulfurization slag is obtained when, in a subsequent treatment step, the wastewater is to be treated with chlorine, to reduce the ammonia content thereof. If phenols are present at the chlorination stage, chlorinated phenols form, which are an environmental hazard. The presence of iron and iron oxides in the slag allows for deposition of phenols as iron complexes prior to any chlorination step. Since both the slag and the wastewater are generated in generally the same location, transportation costs for components of the process of the invention costs are substantially reduced.

Since the sludge resulting from the treatment process of the invention contains amounts of iron oxides, the sludge may be suitable for sintering to salvage the iron. Dewatering of sludge will be required prior to sintering. Alternatively, the sludge may be suitably discarded.

An additional source of wastewater for treatment by desulfurization slag are coke plant effluents containing residual tar and oils, some organic substances which are inhibitory to biological treatment and large quantities of ammonia and phenols. Contact of these effluents with the milled slag permits absorption of the residual tar oils and the inhibitory organic substances to the milled slag which may then be allowed to settle. The tar and oil contaminants are believed to be adsorbed/absorbed to the milled slag and specifically to the iron oxide component thereof. The tars and oils may be deposited with the milled slag once agitation is halted. Thus the pretreated effluent is more amenable to the subsequent ammonia stripping and biodecomposition of phenols. In this instance as well the generated wastewater and slag are usually in proximity and transporation costs may thus be reduced.

It will be understood that the wastewaters suitable for treatment by desulfurization slag detailed above are presented by way of example only. The efficacy of the slag is present with other wastewaters bearing heavy metal ions and/or organic compounds including phenols.

The following examples illustrate a preferred embodiment of the present invention:

EXAMPLE 1

A simulated blast furnace blowdown wastewater obtained by an addition of 50 mg/L of zinc cations to tap water was treated by an addition of 3.5 g/L of powdered desulfurization slag, rapid mixing (velocity gradient of 130 sec$^-$) for 2 min., followed by slow mixing (velocity gradient of 30 sec$^{-1}$) for 15 min., settling for 30 min., and a dual media filtration. The effluent contained only 0.18 mg/L of dissolved zinc cations, and the total concentration of zinc in it was 1.73 mg/L. The concentration of dissolved sulfides in the effluent was below 1 mg/L.

EXAMPLE 2

The blow-down water from the blast furnace recirculation system containing originally about 4 mg/L of zinc cations and 30 µg/L of phenols was treated according to the method of Example 1. The concentration of the soluble zinc was decreased to 0.04 mg/L and phenols were removed to the level of non-detectable concentrations (below 1 µg/L).

I claim:

1. A method of treating waste water containing a contaminant including a heavy metal cation consisting essentially of mixing said waste water with an effective amount of desulfurization slag to cause deposition of said contaminant, said desulfurization slag including from about 45-45 weight % iron in the form of iron oxides, from about 1.5-1.6 weight % sulfur in combined form and from about 10 to about 15 weight % of calcium in the form of calcium oxide and calcium sulfides based on the table weight of said desulfurization slag, causing deposition of said contaminant from the mixture, and separating the deposit from the supernatant liquid.

2. The method of claim 1 wherein said slag is of generally uniform particle size.

3. The method of claim 2 wherein said contaminant is a mixture of heavy metal cations and phenols.

4. The method of claim 3 wherein said wastewater is water which has been used in scrubbing gases evolved during smelting of iron ore.

5. The method of claim 3 wherein said heavy metal cations are cations of heavy metals selected from the group consisting of zinc, copper, cadmium, nickel, lead, mercury, manganese and chromium or combinations thereof.

6. The method of claim 2 wherein said contaminant includes tars, oils and phenols.

7. The method of claim 6 wherein said contaminant includes organic substances which are inhibitory to biodegradation of phenols.

8. The method of claim 6 wherein said wastewater is effluent generated during manufacture of coke.

9. The method of claim 4 or claim 8 wherein the resultant supernatant liquid is subsequently chlorinated as a further treatment step.

10. The method of claim 2 wherein said mixing is effected by creating turbulence of said wastewater acting in contact with said slag.

11. The method of claim 10 wherein said turbulence is abated after initial contact of said wastewater and slag so as to allow reaction of said calcium oxide, calcium sulfide and iron oxides with said contaminant.

12. The method of claim 2 wherein the deposit is subsequently dried and sintered.

* * * * *

UNITED STATES PATENT AND TRADEMARK OFFICE
CERTIFICATE OF CORRECTION

PATENT NO. : 4,705,638
DATED : November 10, 1987
INVENTOR(S) : Jerzy J. Ganczarczyk It is certified that error appears in the above-identified patent and that said Letters Patent is hereby corrected as shown below:

In column 3, line 14, "$CaO + H_2O \rightarrow Ca(OH)_2 Zn^{2+} \rightarrow +Zn(OH)_2 \downarrow +Ca^{2+}$-" should read -- $CaO + H_2O \rightarrow Ca(OH)_2 + Zn^{2+} \rightarrow Zn(OH)_2 \downarrow + Ca^{2+}$ --;

In column 3, line 15, "$CaS + Zn^{2+} \rightarrow ZnS \downarrow + Ca^{2+}$" should read -- $CaS + Zn^{2+} \rightarrow ZnS \downarrow + Ca^{2+}$ --;

In claim 1, column 5, line 8, "45-45" should read --45-48--

In claim 1, column 5, line 12, "table" should read --total--;

Signed and Sealed this

Fifth Day of July, 1988

Attest:

DONALD J. QUIGG

Attesting Officer

Commissioner of Patents and Trademarks